UNITED STATES PATENT OFFICE.

CLAUDE A. O. ROSELL, OF NEW YORK, N. Y., ASSIGNOR TO TURCO-HALVAH COMPANY (INC.), OF NEW YORK, N. Y., A CORPORATION OF NEW YORK.

FOOD PRODUCT.

1,154,059.

Specification of Letters Patent.

Patented Sept. 21, 1915.

No Drawing.

Application filed March 10, 1915. Serial No. 13,342.

*To all whom it may concern:*

Be it known that I, CLAUDE A. O. ROSELL, a citizen of the United States, and a resident of New York, in the county of New York and State of New York, have invented certain new and useful Improvements in Food Products, of which the following is a specification.

This invention relates to food products in the form of sweet meats containing oleaginous material and more particularly to that variety of Turkish candy which is known in the trade as "halvah."

The invention consists of a food product which is as good as, and more economical to make, than products having the same object in view which have previously been made.

To make this new food product I make use of oil of Indian corn or maize, usually called maize oil or corn oil. I compound this with ground oleaginous material and sugar, or sugar and glucose. To make the material lighter in color and texture, a small amount of extract of soap root may be used in its manufacture.

Halvah, as originally made, and as it has been made for centuries, consists essentially of ground sesame seeds, sugar and sesame oil. In later years other forms of oleaginous seeds such as peanuts and other forms of oil such as peanut oil and cotton seed oil have been used to replace the sesame oil in whole or in part, owing to the expense of sesame oil. This substitution has been made to modify the flavor of the finished product, but more especially on the ground of economy.

To make this compound I take any form of sugar or sucrose and add it to corn syrup, preferably in the proportion of twenty to forty parts by weight of sucrose, which quantity is added to dextrose, corn syrup or confectioners' glucose, using enough of the latter to make 100 parts of mixture. This mixture is heated until the sucrose is all dissolved and the solution has attained a temperature of 235° to 250° F. In a separate vessel, maize oil is added to ground oleaginous material, such as sesame seed, peanuts, almonds, cocoanut meat, etc., and this mixture of oil and ground seed is then added to and thoroughly mixed with the heated solution of sugar and corn syrup or confectioners' glucose. The quantity of oil and ground oleaginous material is preferably equal to the combined weight of the solution of sucrose and corn syrup. If desired, a small amount of aqueous extract of soap root, say one-quarter to ½ of 1% may be added to the mixture of sucrose and corn syrup or to the mixture of total ingredients. The ground oleaginous material to be used is made from seed which is first freed from the shells, foreign seeds, gravel or other impurities. They are then lightly roasted, just enough to make them brittle enough to be easily ground, they are then ground and they are then ready to be added to the mixture. If desired, a mixture of the ground oleaginous seeds may be used to vary the flavor of the product. To the ground oleaginous material, the maize oil is added, preferably in the proportion of equal parts of ground material and oil. The latter should preferably be the highest grade of salad oil. After the ingredients have been mixed and are yet hot, the mixture is thoroughly stirred; afterward it is allowed to cool until it has thickened considerably when it is poured into suitable containers, preferably metal boxes or cans, when it is ready for the market.

The use of maize oil has the advantage that it is of a pleasing flavor, keeps for a long time in the atmosphere before becoming noticeably rancid, is digestible, and is cheaper than any other oil of equal quality.

In place of a mixture of glucose and sucrose, the latter may be used alone in which case it is heated with water and a small percentage, say one-quarter per cent. of an acid tartrate such as cream of tartar, after which the solution is used in the same way as a solution of corn syrup and sucrose. Likewise, corn syrup may be used without sucrose. In this case the amount of the syrup used will have to be increased. In this modification the finished product has a flavor inferior to that which it has when sucrose is used alone or as a part of the sweetening agent.

When this product is finished, it constitutes a friable compound having a consistence just solid enough to prevent crumbling when kept in the normal containers.

Of the mixtures of oleaginous seeds that may be used I prefer a mixture of ground sesame seeds and ground peanuts.

What I claim as new is:

1. A food product containing maize oil, ground oleaginous seed and sweetening agent in proportions to form a solid friable compound.

2. A food product containing maize oil, ground oleaginous seed, corn syrup and sucrose in proportion to form a solid friable compound.

3. A food product containing maize oil, ground sesame seed, corn syrup and sucrose in proportion to form a solid friable compound.

4. A food product containing maize oil, ground sesame seed, ground peanuts, corn syrup and sucrose in proportion to form a solid friable compound.

Signed at New York in the county of New York and State of New York, this 8th day of March A. D. 1915.

CLAUDE A. O. ROSELL.

Witnesses:
NAOMI BLUNN,
S. V. SPILLE.